(12) United States Patent
Muramatsu

(10) Patent No.: US 8,792,131 B2
(45) Date of Patent: Jul. 29, 2014

(54) IMAGE PROCESSING SYSTEM, INFORMATION PROCESSING SYSTEM, CONTROL METHOD, AND PROGRAM

(75) Inventor: Mizuki Muramatsu, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 744 days.

(21) Appl. No.: 13/124,374

(22) PCT Filed: Feb. 22, 2011

(86) PCT No.: PCT/JP2011/000973
§ 371 (c)(1),
(2), (4) Date: Apr. 14, 2011

(87) PCT Pub. No.: WO2011/111320
PCT Pub. Date: Sep. 15, 2011

(65) Prior Publication Data
US 2011/0279837 A1    Nov. 17, 2011

(51) Int. Cl.
*G06F 3/12* (2006.01)
(52) U.S. Cl.
USPC .......... 358/1.9; 358/1.12; 358/1.13; 358/1.15
(58) Field of Classification Search
USPC ........... 358/1.1, 1.4, 1.8, 1.9, 1.12, 1.13, 1.15
See application file for complete search history.

(56) References Cited

U.S. PATENT DOCUMENTS

| | | | | |
|---|---|---|---|---|
| 7,218,409 | B2* | 5/2007 | Ferlitsch | 358/1.15 |
| 7,359,081 | B2* | 4/2008 | Wanda et al. | 358/1.15 |
| 2008/0307212 | A1* | 12/2008 | Asano | 713/1 |

FOREIGN PATENT DOCUMENTS

JP    2006-287745 A    10/2006

* cited by examiner

*Primary Examiner* — Allen H Nguyen
(74) *Attorney, Agent, or Firm* — Canon USA Inc. IP Division

(57) ABSTRACT

In printing the same image data as image data printed by a printing unit of an image forming apparatus from another image forming apparatus, an image information processing system and an information processing system are capable of executing arbitrary high-quality printing, which can be implemented by acquiring image data received from an image processing server stored on the image forming apparatus, based on a reference location of a shortcut transmitted from the image processing server. The image information processing system and the information processing system can be controlled by a control method, which can be implemented by a program.

9 Claims, 12 Drawing Sheets

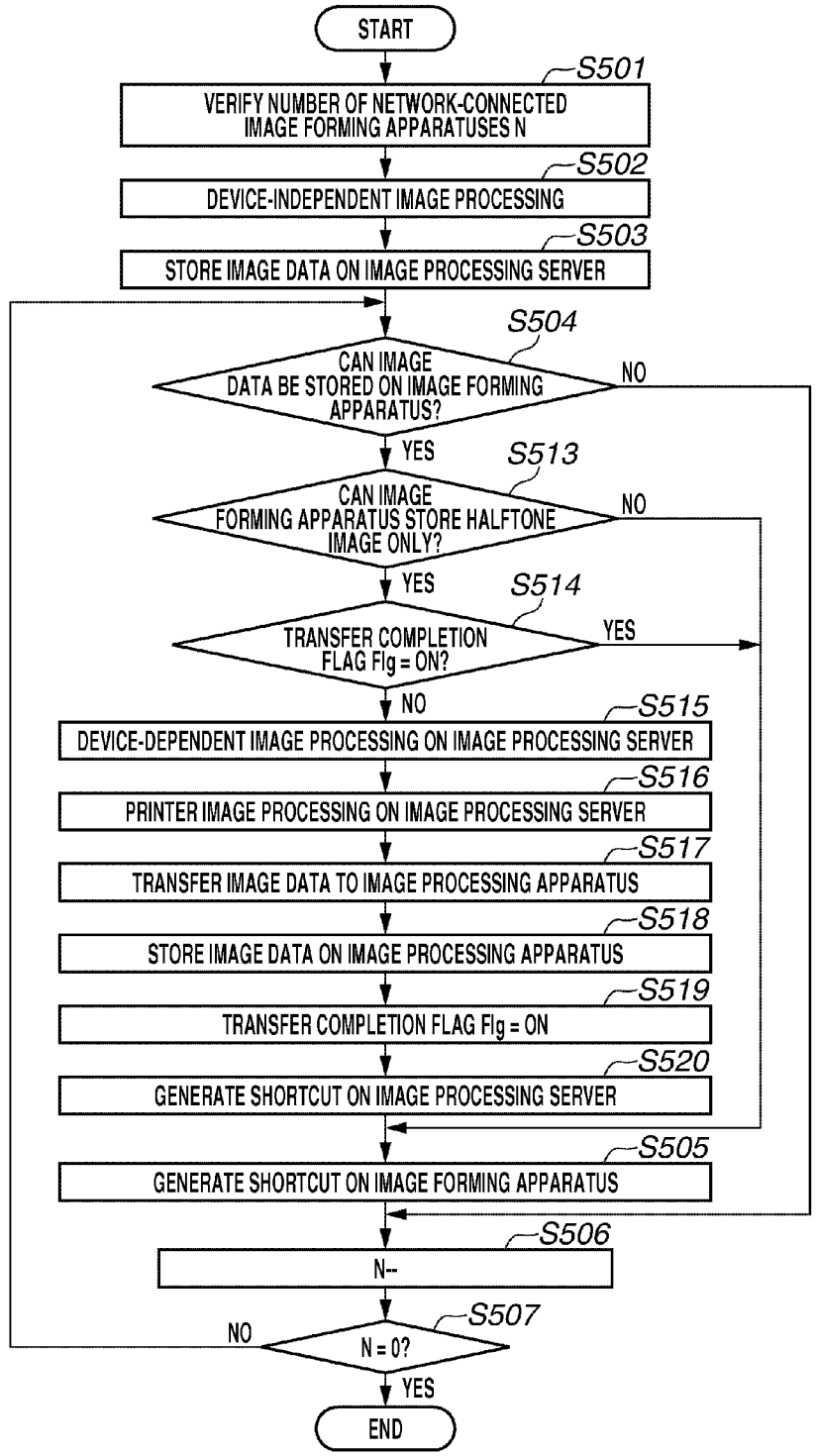

IMAGE PROCESSING SYSTEM, INFORMATION PROCESSING SYSTEM, CONTROL METHOD, AND PROGRAM

TECHNICAL FIELD

The present invention relates to an image processing system and an information processing system including an image processing apparatus configured to execute a part of image processing on input digital image data and an image forming apparatus configured to print image-processed image data and also relates to a method for controlling the systems and a program therefor.

BACKGROUND ART

In outputting color data generated on a computer by using a color printer or a color multifunction peripheral (MFP) (hereinafter simply referred to as an "image forming apparatus"), a conventional method executes image processing according to a characteristic of each output device. In recent years, with the widespread use of communication via the Internet, an external server, which functions as an image processing server, has been used to execute image processing instead of using a locally provided image forming apparatus to execute the image processing.

Japanese Patent Application Laid-Open No. 2006-287745 discusses a method for storing image data of a format which is common to all image forming apparatuses connected to an image processing server and converting the stored image data of the common format into data of a format compliant with the specification of the image forming apparatus that prints the data.

SUMMARY OF INVENTION

According to an aspect of the present invention, an image processing system includes a first image forming apparatus, a second image forming apparatus of the same model as the first image forming apparatus, and an information processing system. In the image processing system, the first image forming apparatus includes a request unit configured, in printing an image designated by a user, to transmit a request for acquiring image data corresponding to the image designated by the user and having been stored within the information processing system to the information processing system. In addition, in the image processing system, the information processing system includes a dependent processing unit configured, if a request transmitted from the request unit has been received, to execute image processing dependent on a model of the first image forming apparatus on the image data. Furthermore, in the image processing system, the first image forming apparatus includes a storage unit configured to receive the image data that has been image-processed by the dependent processing unit and to store the received image data and a first printing unit configured to print the received image data stored on the storage unit. In addition, in the image processing system, the information processing system includes a transmission unit configured to transmit a shortcut for referring to the received image data stored on the storage unit to the second image forming apparatus of the same model as the first image forming apparatus. Furthermore, in the image processing system, the second image forming apparatus includes an acquisition unit configured, in printing the image designated by the user, to acquire the received image data stored on the storage unit based on a reference location indicated by the shortcut transmitted from the transmission unit, and a second printing unit configured to print the image data acquired by the acquisition unit.

Further features of the present invention will become apparent from the following description of exemplary embodiments with reference to the attached drawings.

BRIEF DESCRIPTION OF DRAWINGS

The accompanying drawings, which are incorporated in and constitute a part of the specification, illustrate exemplary embodiments, features, and aspects of the invention and, together with the description, serve to explain the principles of the present invention.

FIG. 12 is a flow chart illustrating an exemplary flow of job generation processing according to the third exemplary embodiment of the present invention.

DESCRIPTION OF EMBODIMENTS

Various exemplary embodiments, features, and aspects of the invention will be described in detail below with reference to the drawings.

The conventional method discussed in Japanese Patent Application Laid-Open No. 2006-287745 converts image data of a format common to a plurality of image forming apparatuses that request printing into a unique format of an image forming apparatus. Accordingly, an image processing server that executes image processing may suffer a high processing load.

Furthermore, as the number of image forming apparatuses increases, the processing load on the image processing server may increase. In addition, if the same image data is stored on a plurality of image forming apparatuses, storage areas of the storage unit of the image forming apparatuses may be wastefully consumed.

The present invention is directed to an image processing system which provides a method for reducing the processing load on the server.

A first exemplary embodiment of the present invention will now be described below. In the present exemplary embodiment, at least one image processing server is connected to a network. In addition, a plurality of image forming apparatuses is also connected to the network. The image processing server can implement device-independent image processing and device-dependent image processing. Various image processing including the two types of image processing will be described in detail below.

The present exemplary embodiment can output image data to the image forming apparatus by pull-printing the image data on an image forming apparatus designated by a user.

Figure 1:
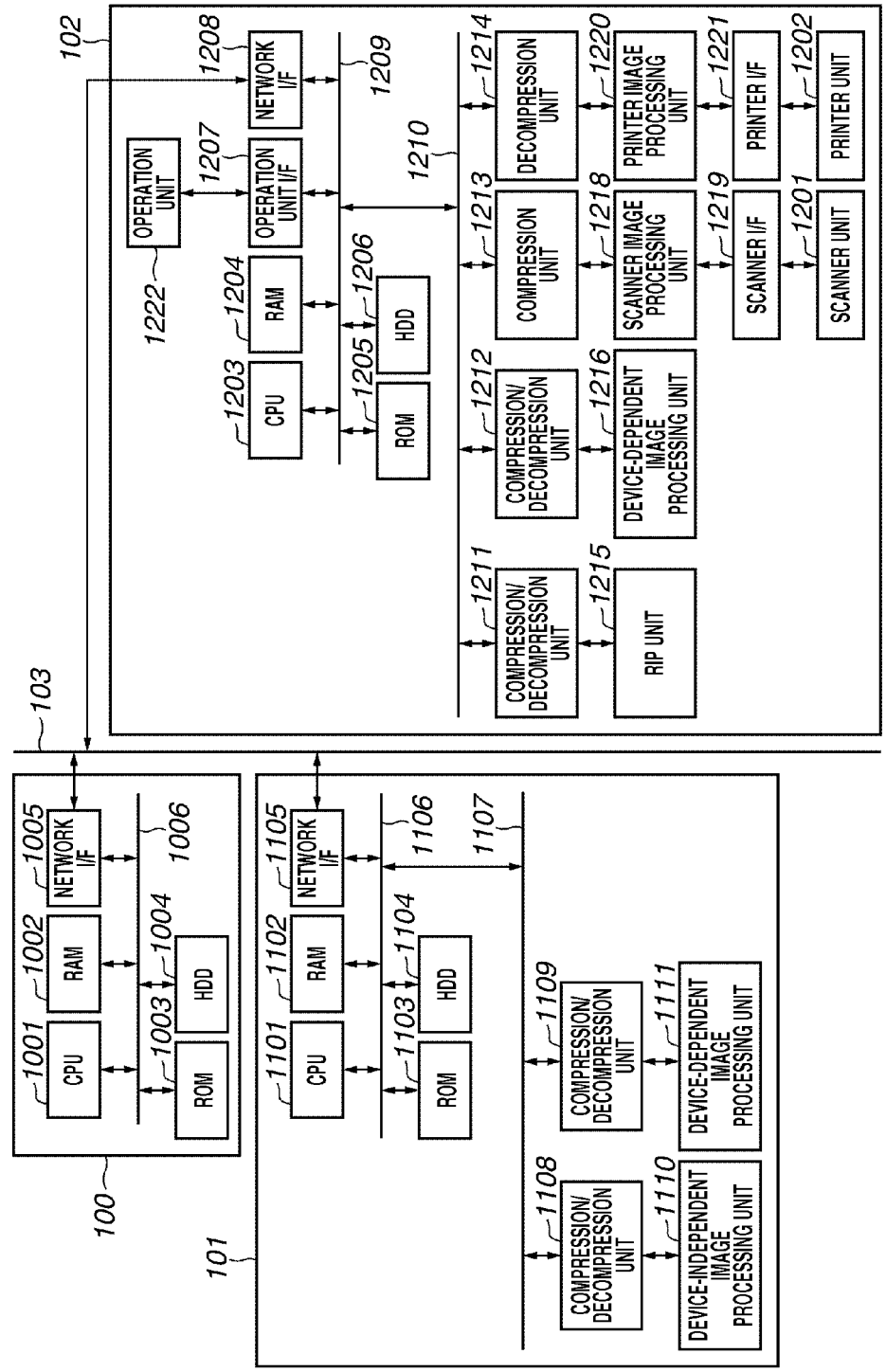
FIG. 1 illustrates an exemplary functional configuration of an image processing system according to a first exemplary embodiment of the present invention.

FIG. 1 is a block diagram illustrating an exemplary configuration of the entire image processing system according to the present exemplary embodiment.

Referring to FIG. 1, an external apparatus 100, such as a desktop personal computer (PC), a notebook PC, or a mobile terminal, an image processing server 101, and an image forming apparatus 102 are connected to one another via a local area network (LAN) 103. With this configuration, the apparatuses included in the image processing system can communicate with one another. Each apparatus is also a computer.

The external apparatus 100 includes a central processing unit (CPU) 1001, a random access memory (RAM) 1002, a read-only memory (ROM) 1003, a hard disk drive (HDD) 1004, and a network interface (I/F) 1005. Various functions are implemented by the CPU 1001 by loading and executing a program from the HDD 1004 on the RAM 1002. More specifically, various functions include, for example, a function for uploading image data onto the image processing server 101.

The network I/F 1005 is connected to the LAN 103 and a system bus 1006 and functions to transmit and receive information to and from the image processing server 101. The image processing server 101 is connected to an external apparatus via the LAN 103. With this configuration, image data and device information can be input and output.

A CPU 1101 centrally controls various processing executed within the image processing server 101 according to a control program stored on a ROM 1103. The image processing server 101 can be an information processing system including a plurality of servers. In addition, the information processing system can also be a distributed processing system configured to process a job by using each of a plurality of virtual machines that becomes available by increasing the number thereof by using a method, such as "scale out".

In the present exemplary embodiment, the image processing server 101 is also referred to as an "information processing system" because the number of the image processing servers 101 is not particularly limited to a specific number.

A RAM 1102 functions as a system work memory used for the CPU 1101 to operate. In addition, the RAM 1102 functions as a memory for temporarily storing image data. An HDD 1104 can store system software and image data. A network I/F 1105 is connected to the LAN 103 and the system bus 1106. Accordingly, information can be input and output via the network I/F 1105.

An image bus 1107 is a data transmission path for transmitting and receiving image data. The image bus 1107 includes a peripheral component interconnect (PCI) bus or Institute of Electrical and Electronic Engineers (IEEE)1394. Compression/decompression units 1108 and 1109 compress or decompress image data.

A device-independent image processing unit 1110 receives image data transmitted from the compression/decompression unit 1108 and executes device-independent image processing on the received image data. The image-processed image data is stored on the HDD 1104 via the compression/decompression unit 1108. The processing executed by the device-independent image processing unit 1110 will be described in detail below.

A device-dependent image processing unit 1111 receives the image data processed by the device-independent image processing unit 1110 and transmitted from the compression/decompression unit 1109 via the HDD 1104 and executes device-dependent image processing on the received image data. The image-processed image data is stored on the HDD 1104 via the compression/decompression unit 1109. The processing executed by the device-dependent image processing unit 1111 will be described in detail later below.

The image forming apparatus 102 is electrically connected to the scanner unit 1201 and a printer unit 1202. In addition, the image forming apparatus 102 is connected to an external apparatus via the LAN 103. With this configuration, image data and device information can be input and output.

A CPU 1203 centrally controls an access to and from various devices connected to the system according to a control program stored on a ROM 1205. In addition, the CPU 1203 centrally controls various processing executed within the image forming apparatus 102.

The scanner unit 1201 implements a function for reading a document set on a document stand and for generating a document image (image data). In addition, the printer unit 1202 implements a function for printing the document image (raster image data) on a recording medium by using a printer engine (not illustrated).

A RAM 1204 functions as a system work memory used for the CPU 1203 to operate. In addition, the RAM 1204 functions as a memory for temporarily storing image data. The RAM 1204 includes a static random access memory (SRAM) which holds the stored content even after the power off, and a dynamic random access memory (DRAM) in which the stored content is deleted after the power off. A ROM 1205 stores a boot program for the image forming apparatus 102. An HDD 1206 stores system software and image data.

An operation unit I/F 1207 is an interface to connect a system bus 1209 to an operation unit 1222. The operation unit I/F 1207 receives image data to be displayed on the operation unit 1222 via the system bus 1209 and outputs the received image data to the operation unit 1222. Furthermore, the operation unit I/F 1207 outputs information input via the operation unit 1222 to the system bus 1209.

The network I/F 1208 is connected to the LAN 103 and the system bus 1209 to implement the input and output of information. An image bus 1210 is a data transmission path for transmitting and receiving image data. The image bus 1210 includes a PCI bus or IEEE1394.

A scanner image processing unit 1218 executes correction, processing, and editing on the image data received from the scanner unit 1201 via a scanner I/F 1219. The scanner image processing unit 1218 determines the type of the received image data (i.e., whether the image data is color document image data or monochromatic document image data or whether the image data is text image data or photographic image data). In addition, the scanner image processing unit 1218 adds a result of the determination to the image data. The information added to the image data is referred to as "attribute data".

A compression unit 1213 receives image data and divides the received image data into the unit of a 32×32-pixel block. The 32×32-pixel image data is referred to as "tile data". A region of a document (a paper medium before its image is read) corresponding to the tile data is referred to as a "tile image". To the tile data, average luminance information about the 32×32-pixel block and the coordinate position of the tile image within the document are added as header information. In addition, the compression unit 1213 compresses image data including a plurality of pieces of tile data.

A decompression unit 1214 decompresses the image data including a plurality of pieces of tile data and then rasterizes the decompressed image data and transmits the same to a printer image processing unit 1220. The printer image processing unit 1220 receives the image data transmitted from the decompression unit 1214. Furthermore, the printer image processing unit 1220 executes image processing on the image data while referring to the attribute data that has been added to the image data. The image-processed image data is output to the printer unit 1202 via a printer I/F 1221. The processing executed by the printer I/F 1221 will be described in detail below.

A device-dependent image processing unit 1216 executes processing similar to that executed by the device-dependent image processing unit 1111 included in the image processing server 101. More specifically, the device-dependent image processing unit 1216 receives the image data transmitted from the LAN 103 via the HDD 1104 included in the image processing server 101 and executes device-dependent image processing on the received image data. The image-processed image data is stored on an HDD 1206 via a compression/decompression processing unit 1212.

A raster image processing (RIP) unit 1215 receives intermediate data generated based on page description language (PDL) code data transmitted from a PC and generates bitmap data (multivalued data) based thereon.

Figure 2:
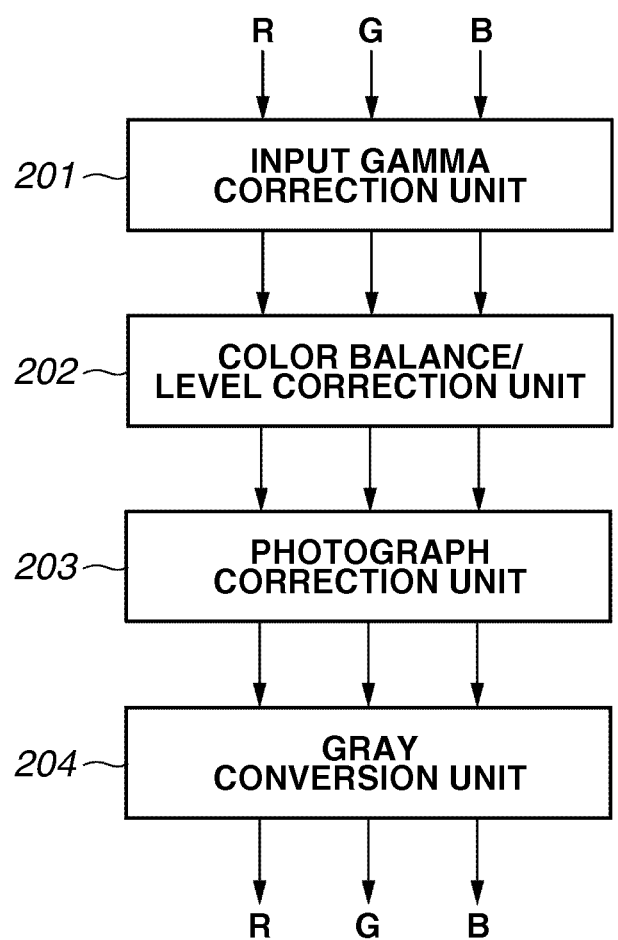
FIG. 2 is a block diagram illustrating an exemplary inner configuration of a device-independent image processing unit according to the first exemplary embodiment of the present invention.

FIG. 2 illustrates an exemplary configuration of the device-independent image processing unit 1110 included in the image processing server 101. The device-independent image processing (hereinafter may also be simply referred to as "independent processing") can process digital image data regardless of the type of the image forming apparatus by common processing.

A gamma correction unit 201 executes correction (input gamma correction processing) so that an input signal value should be proportional to a luminance value after the signal is output. The color balance/level correction unit 202 executes correction (color balance/level correction processing) of color cast of image data input as red (R), green (G), and blue (B) (RGB) image or correction of overexposure and underexposure.

A photograph correction unit 203 executes correction of RGB image data captured by using a digital camera to increase the visibility (photograph correction processing) by, for example, increasing the brightness of a region of the image having an image of a person's face. A gray conversion unit 204 converts color data into monochromatic data (gray conversion processing). Various processing can be implemented by the CPU by loading and executing programs that implement various processing.

Figure 3:
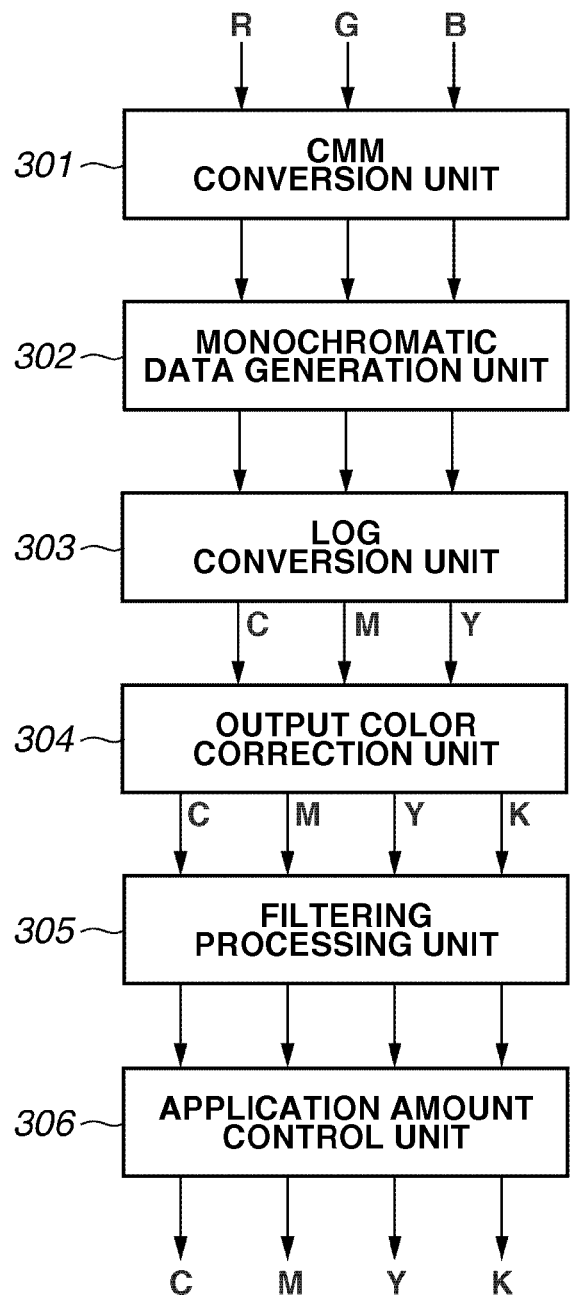
FIG. 3 is a block diagram illustrating an exemplary inner configuration of a device-dependent image processing unit according to the first exemplary embodiment of the present invention.

FIG. 3 illustrates an exemplary inner configuration of the device-dependent image processing units 1111 and 1216 included in the image processing server 101 and the image forming apparatus 102, respectively. The device-dependent image processing (hereinafter may also be simply referred to as "dependent processing") implements optimum processing according to the type of the image forming apparatus. Basically, the device-dependent image processing is executed exclusively and uniquely for each type of the image forming apparatus. More specifically, if the color reproduction space is different for an image forming apparatus A and an image forming apparatus B, it is necessary to execute optimum image processing in the color reproduction space of each of the image forming apparatuses A and B.

The HDD 1104 of the image processing server 101 stores image processing settings of each of a plurality of image forming apparatuses.

Various image data, such as gray scale image data, RGB image data, or cyan (C), magenta (M), yellow (Y), and black (K) (CMYK) image data, can be input to a color management module (CMM) conversion unit 301. The CMM conversion unit 301 executes color matching processing by the International Color Consortium (ICC) profile or the Windows Color System (WCS).

The monochromatic data generation unit 302 executes processing for converting color data into monochromatic data (monochromatic data generation processing). The log conversion unit 303 executes processing for converting the luminance density (luminance density conversion processing). More specifically, the log conversion unit 303 converts image data input as an RGB image into CMY image data.

An output color correction unit 304 corrects an output color (output color correction processing). More specifically, the output color correction unit 304 converts image data input as a CMY image into CMYK image data by using a table or a matrix.

A filtering processing unit 305, in order to decrease the roughness of an image down to an almost invisible level, executes smoothing of high-frequency components only. In addition, the filtering processing unit 305 executes edge enhancement for sharply expressing a character (filtering processing).

An application amount control unit 306 executes processing for restricting a signal value to a highest possible signal value that can be expressed by the image forming apparatus 102 (application amount control processing). More specifically, if the application amount is 200%, the application amount control unit 306 corrects an output CMYK value with a configuration ratio of two colors, at the maximum, for four colors of CMYK. The above-described various processing is implemented by the CPU by loading and executing programs that implement the processing.

Figure 4:
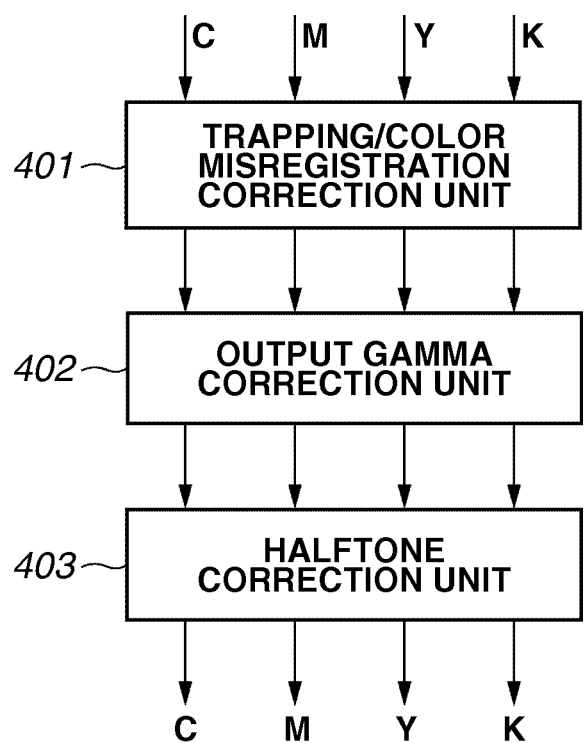
FIG. 4 is a block diagram illustrating an exemplary inner configuration of a printer image processing unit according to the first exemplary embodiment of the present invention.

FIG. 4 illustrates an exemplary inner configuration of the printer image processing unit 1220. The printer image processing unit 1220 generates image data to be output to the printer unit 1202. The printer image processing unit 1220 uses a coefficient optimum to a plurality of image forming apparatuses of the same model. The above-described processing executed according to the unique characteristic of the image forming apparatus (the device characteristic) is referred to as "unique dependent processing". More specifically, for the image forming apparatuses A and B, which are of the same model, the printer image processing unit 1220 executes correction unique to individual machine of density variation or color misregistration, which may occur due to individual differences among the apparatuses.

A trapping/color misregistration correction unit 401 executes correction according to the amount of color misregistration on the printer unit (trapping/color misregistration correction processing). More specifically, if the amount of color misregistration between C and K is one pixel, white dots (white pixels) that may otherwise occur due to color misregistration can be prevented by adding one C pixel.

The output gamma correction unit 402 executes correction processing (output gamma correction processing) so that the signal value input to the output gamma correction unit 402 should be proportional to a reflection density value after the signal is output. A halftone correction unit 403 executes halftone correction processing according to the number of gradations of the printer unit that outputs the input image data. More specifically, the halftone correction unit 403 binarizes the received high-gradation image data or multiplicates the received high-gradation image data into 32-pixel image data. The above-described various processing is implemented by the CPU by loading and executing programs that implement various processing.

Now, job generation processing by the image processing server 101 and pull printing processing by the image forming apparatus 102 will be described in detail below. To begin with, the job generation processing by the image processing server 101 will be described in detail.

Figure 5:
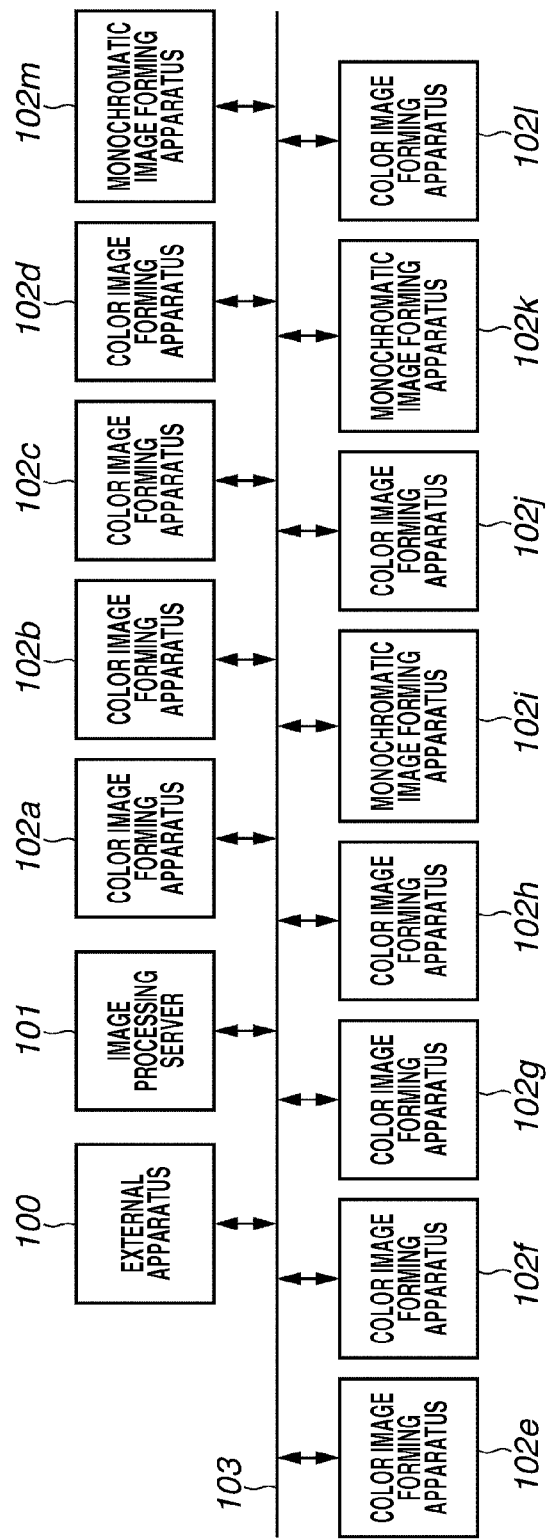
FIG. 5 illustrates an example of an image processing system according to the first exemplary embodiment of the present invention.

In the present first exemplary embodiment, it is supposed, as illustrated in FIG. 5, that a plurality of image forming apparatuses 102a through 102h of the same model and a plurality of image forming apparatuses 102i through 102m, of models different from the image forming apparatuses 102a through 102h, is connected to the network. In other words, the image forming apparatus 102b (a second image forming apparatus) is another image forming apparatus of the same model as the model of the image forming apparatus 102a (a first image forming apparatus). Furthermore, the image forming apparatus 102i is also another image forming apparatus (a third image forming apparatus) whose model is different from the model of the image forming apparatus 102a.

Figure 6:
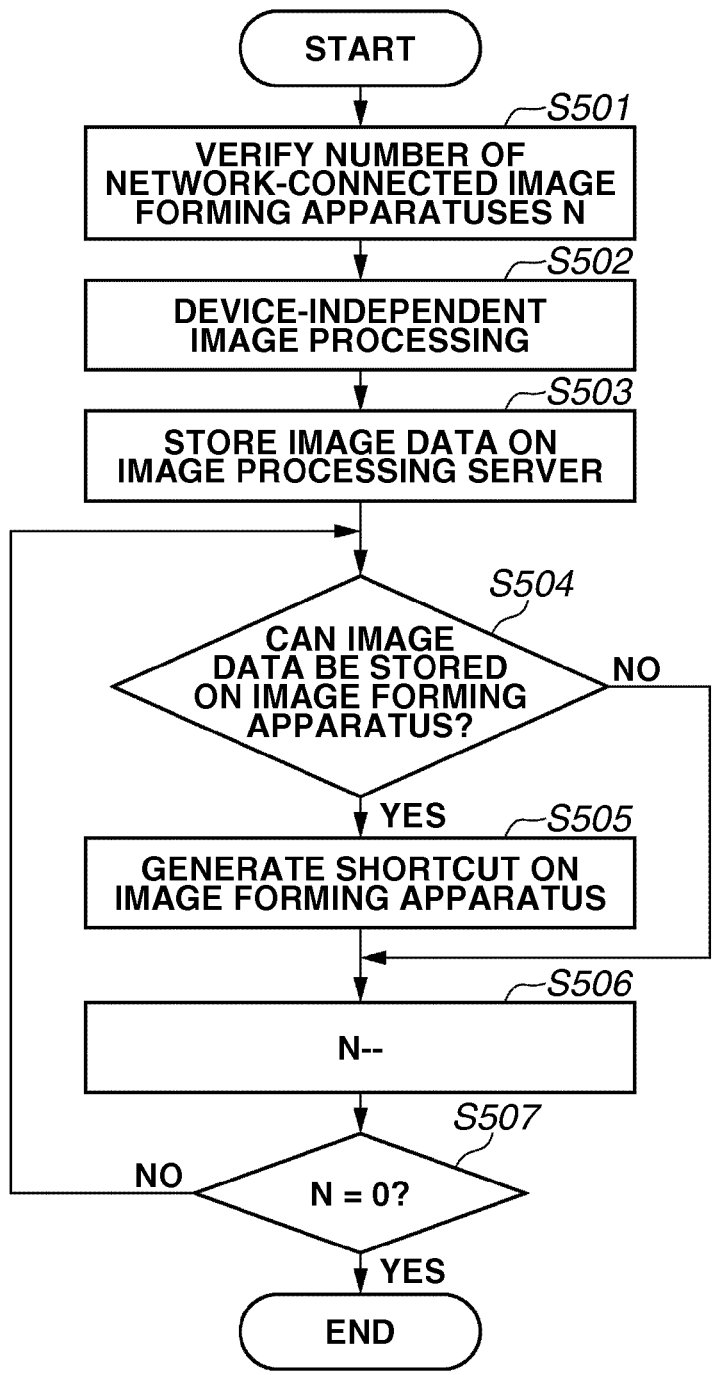
FIG. 6 is a flow chart illustrating an exemplary flow of job generation processing according to the first exemplary embodiment of the present invention.

FIG. 6 is a flow chart illustrating an exemplary flow of job generation processing, which is executed by the image processing server 101, according to the present exemplary embodiment. A control program for implementing the processing illustrated in FIG. 6 is loaded and executed by the CPU 1101 from the ROM 1103 as described above.

When a job (including image data) is received from an external apparatus, the processing illustrated in FIG. 6 starts.

In step S501, after receiving a job (including image data) from the external apparatus 100, the CPU 1101 verifies the number of network-connected image forming apparatuses N. In the image processing system illustrated in FIG. 5, the number of the network-connected image forming apparatuses N is 13.

In step S502, the CPU 1101 controls the device-independent image processing unit 1110 to execute image processing by the device-independent image processing on the externally received image data. In step S503, the CPU 1101 stores the image data processed by the device-independent image processing on the HDD 1104.

In step S504, the CPU 1101 transmits an inquiry to each of the image forming apparatuses 102a through 102m as to whether each apparatus can store image data. The determination as to whether each apparatus can store image data is made as follows. To begin with, the CPU 1101 requests and acquires device configuration information to each of the image forming apparatuses 102a through 102m. If it is determined that an HDD has been mounted according to the acquired device configuration information, then it is determined that the image forming apparatus 102 can store image data.

If it is determined that the image data can be stored on the image forming apparatuses 102a through 102m (YES in step S504), then the processing advances to step S505. In step S505, the CPU 1101 transmits a shortcut image to the storage area of the image forming apparatuses 102a through 102m, such as the HDD 1206.

To the shortcut image, identification information indicating the storage location of original image data stored on the HDD 1104, has been added. The identification information indicating the storage location of the original image data can be described by a data format such as a uniform resource locator (URL), for example. In other words, the shortcut image indicates a reference location of predetermined image data (the original image data). In the present exemplary embodiment, the shortcut image may also be simply referred to as a "shortcut".

In step S506, the CPU 1101 decrements the number of network-connected image forming apparatuses N. In step S507, the CPU 1101 determines whether the number of network-connected image forming apparatuses N is "0".

If it is determined that the number of network-connected image forming apparatuses N is "0" (YES in step S507), then the processing according to the flow chart of FIG. 6 ends. On the other hand, if it is determined that the number of network-connected image forming apparatuses N is not "0" (NO in step S507), then the processing returns to step S504. If it is determined that image data cannot be stored on the image forming apparatuses 102a through 102m (NO in step S504), then the processing advances to step S506.

By executing the above-described processing, a shortcut image of the image data that has been subjected to the device-independent image processing by the image processing server 101 is transmitted to the HDD 1206 of all the network-connected image forming apparatuses 102a through 102m during the job generation processing.

Now, the pull-printing processing by the image forming apparatus 102 will be described in detail. In the present exemplary embodiment, it is supposed, as illustrated in FIG. 5, that a plurality of image forming apparatuses 102a through 102h of the same model and a plurality of image forming apparatuses 102i through 102m, of models different from the image forming apparatuses 102a through 102h, is connected to the network.

Figure 7:
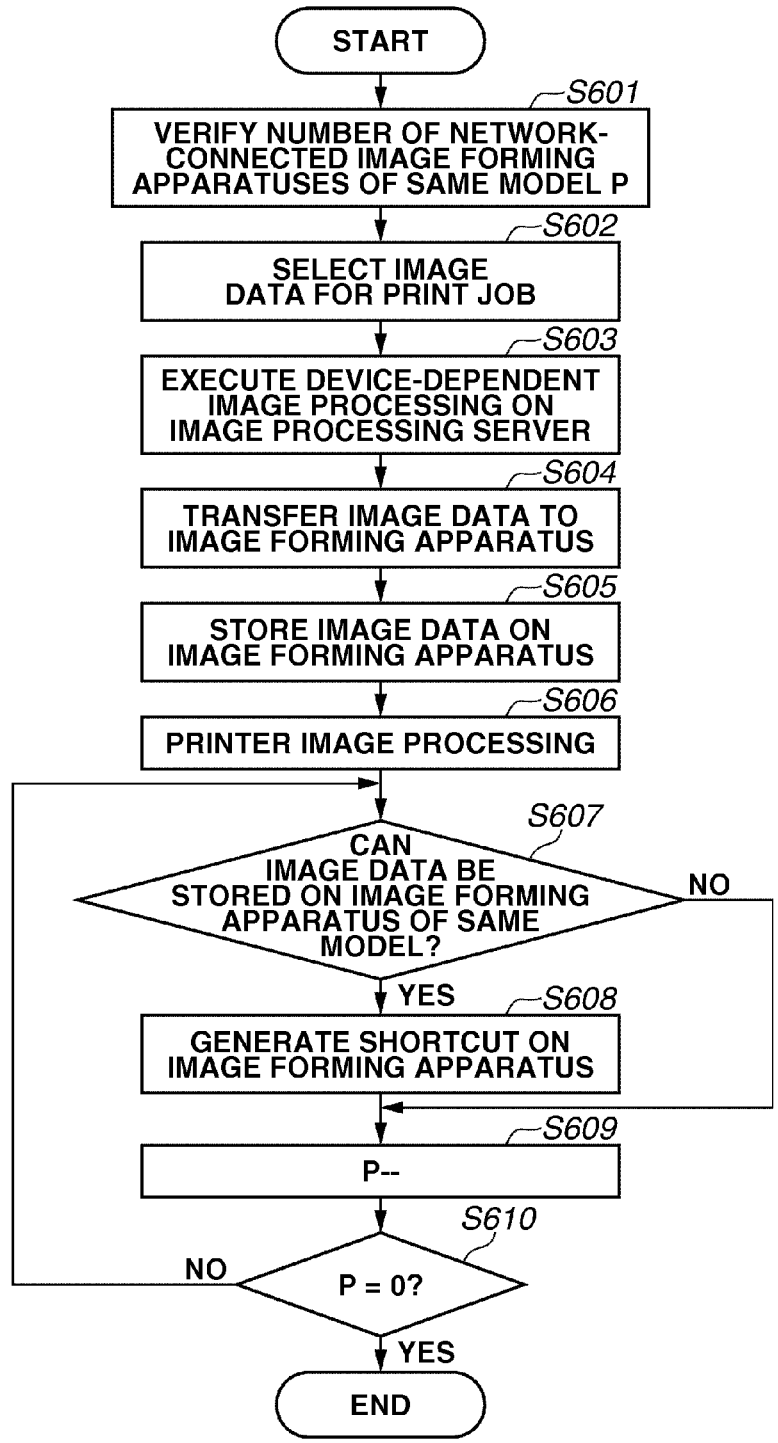
FIG. 7 is a flow chart illustrating an exemplary flow of pull-printing processing according to the first exemplary embodiment of the present invention.

FIG. 7 illustrates an example of the pull-printing processing. A control program that implements the processing illustrated in FIG. 7 is stored on the ROM 1205 as described above and is executed by the CPU 1203.

At first, a user inputs an instruction for executing pull printing via the operation unit 1222 of the image forming apparatus 102a. In the present exemplary embodiment, "pull printing" refers to processing in which a user acquires desired image data from the image processing server 101, to which the image forming apparatus 102a is connected, and prints the acquired image data. In executing the pull-printing, a screen illustrated in FIG. 8 for instructing pull printing is displayed on the operation unit 1222.

Figure 8:
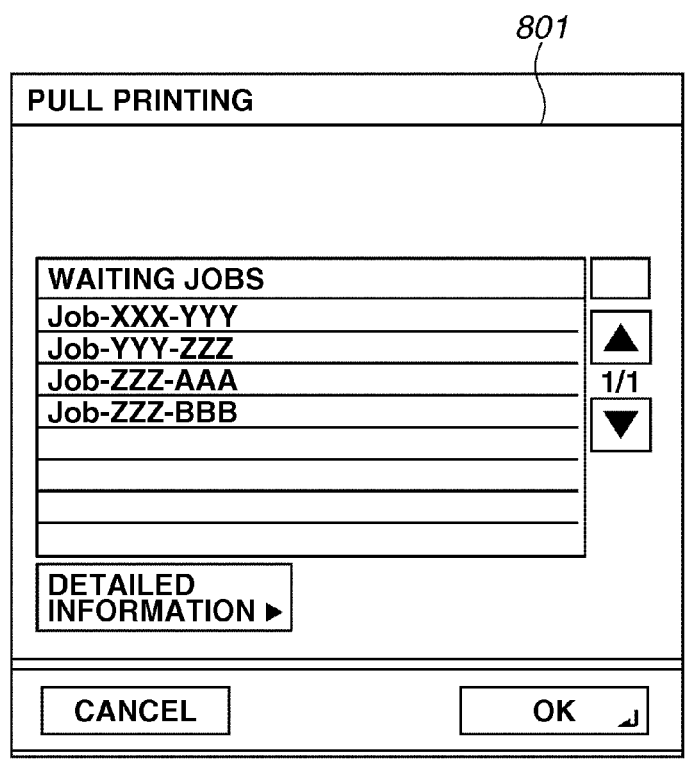
FIG. 8 illustrates an example of a screen for instructing pull-printing, which is displayed on an operation unit according to the first exemplary embodiment of the present invention.

The user selects an image to be printed from among those included in a list illustrated in FIG. 8. When the user selects an image, the CPU 1203 starts processing for acquiring the image data corresponding to the selected image and having been stored on the image processing server 101. More specifically, at this timing, the CPU 1203 starts processing for transmitting a request for acquiring in the above-described manner to the image processing server 101.

After receiving the request, in step S601, the image processing server 101 verifies the number P of image forming apparatuses of the same model as the request input source image forming apparatus 102. In the image processing system illustrated in FIG. 5, the number P of the image forming apparatuses of the same model as the image forming apparatus 102*a* is "8".

In step S602, the image processing server 101 selects image data corresponding to the image whose printing has been instructed by the user via the operation unit 1222 of the image forming apparatus 102*a*. In step S603, the image processing server 101 executes device-dependent image processing on the corresponding image data (i.e., the image data stored on the image processing server 101) by using the device-dependent image processing unit 1111.

In step S604, the image processing server 101 transfers the image data processed by the device-dependent image processing to the image forming apparatus 102*a*. In step S605, the image forming apparatus 102*a* stores the transferred image data on the HDD 1206. In step S606, the printer image processing unit 1220 executes device-unique image processing on the image data and prints the image data by using the printer unit 1202 (equivalent to a first printing unit) of the image forming apparatus 102*a*.

In step S607, the image processing server 101 gives an inquiry as to whether image data can be stored on the image forming apparatuses 102*b* through 102*h* of the same model as the image forming apparatus 102*a*. In order to determine whether the image data can be stored, the image processing server 101 acquires device configuration information from each of the image forming apparatuses 102*b* through 102*h*.

If it is determined that an HDD has been mounted based on the acquired device configuration information, the determined image forming apparatus 102 can store image data. In addition, the image processing server 101 can determine whether the image data can be stored based on the capacity of the HDD.

If it is determined that the image forming apparatuses 102*b* through 102*h* can store the image data, the following processing is executed.

In step S608, the CPU 1203 executes control for transmitting the shortcut image of the image data printed by the image forming apparatus 102*a* to the storage area of the image forming apparatuses 102*b* through 102*h*, such as the HDD 1206. The image data printed by the image forming apparatus 102*a* is stored on the HDD 1206 of the image forming apparatus 102*a* and the shortcut image indicates the reference information to the image data.

To the shortcut image, identification information indicating the storage location of the image data, which has been processed by the device-dependent image processing and stored on the HDD 1206 of the image forming apparatus 102*a*, has been added. The identification information indicating the storage location of the original image data can be described by a URL, for example.

In addition, among the image forming apparatus 102*b* through 102*h*, the image forming apparatus that has been determined to be able to store the image data replaces the shortcut of the image data that has been processed by the device-independent image processing with the shortcut of the image data that has been processed by the device-dependent image processing and transmitted from the image processing server 101.

Accordingly, the image data can be acquired from the functions as existing in the same network without acquiring the image data from the image processing server 101. In other words, the processing load on the image processing server 101 can be effectively reduced.

In step S609, the CPU 1203 decrements the number P of the image forming apparatuses of the same model as the image forming apparatus 102*a*. In step S610, the CPU 1203 determines whether the number P of the image forming apparatuses of the same model as the image forming apparatus 102*a* is "0".

If it is determined that the number P of the image forming apparatuses of the same model as the image forming apparatus 102*a* is "0" (YES in step S610), then the processing ends. On the other hand, if it is determined that the number P of the image forming apparatuses of the same model as the image forming apparatus 102*a* is not "0" (NO in step S610), then the processing returns to step S607.

If it is determined that the image forming apparatuses 102*b* through 102*h* of the same model as the image forming apparatus 102*a* cannot store the image data (NO in step S607), then the processing advances to step S609.

By executing the above-described processing, a shortcut image of the image data that has been processed by the device-dependent image processing by the image processing server 101 is generated on the HDD 1206 of the network-connected image forming apparatuses 102*b* through 102*h* during the pull printing processing.

In executing pull printing from the image forming apparatus 102*b*, the CPU 1203 acquires the image data that has been processed by the device-dependent image processing based on the shortcut image. The acquired image data is then subjected to image processing dependent on the device characteristic of the image forming apparatus 102*b* (unique to the second image forming apparatus) and then is printed by the printer unit 1202 (equivalent to the second printing unit) of the image forming apparatus 102*b*.

In printing the same image data as the image data printed by the image forming apparatus 102*a* from the image forming apparatuses 102*i* through 102*m*, the CPU 1203 acquires image data based on the reference location of the shortcut of the image data processed by the device-independent image processing. Once the pull printing is executed from one of the image forming apparatuses 102*i* through 102*m*, a shortcut of the image data that has been processed by the device-dependent image processing is stored on the image forming apparatuses 102*i* through 102*m* as the case of the image forming apparatuses 102*b* through 102*h*.

As described above, according to the present exemplary embodiment, the image processing server executes the device-independent image processing during the job generation processing. On the other hand, during the pull printing processing, the present exemplary embodiment executes the device-dependent image processing. Accordingly, the image quality of arbitrary printing can be improved. In addition, the processing load on the image processing server can be reduced.

In addition, as described above, the present exemplary embodiment generates a shortcut image for and according to the status of all the network-connected image forming apparatuses. Therefore, the present exemplary embodiment can effectively reduce the amount of data to be processed by the image processing server.

In the above-described first exemplary embodiment, in executing the device-independent image processing on the image processing server 101, a common shortcut image is transmitted to a plurality of the image forming apparatuses 102 connected to the network. In a second exemplary embodiment of the present invention, in executing the device-independent image processing to predetermined image data, two types of processing, i.e., full color image processing and monochromatic image processing are executed. In addition, the shortcut image to be transmitted to the image forming apparatus 102 is changed according to the type of the image forming apparatus 102. Processing, components, and units similar to those of the first exemplary embodiment are provided with same reference numerals and symbols. Accordingly, the detailed description thereof will not be repeated here.

In the present exemplary embodiment, it is supposed, as illustrated in FIG. 5, that a plurality of image forming apparatuses 102a through 102h of the same model and a plurality of image forming apparatuses 102i through 102m, of models different from the image forming apparatuses 102a through 102h, is connected to the network.

Figure 9:
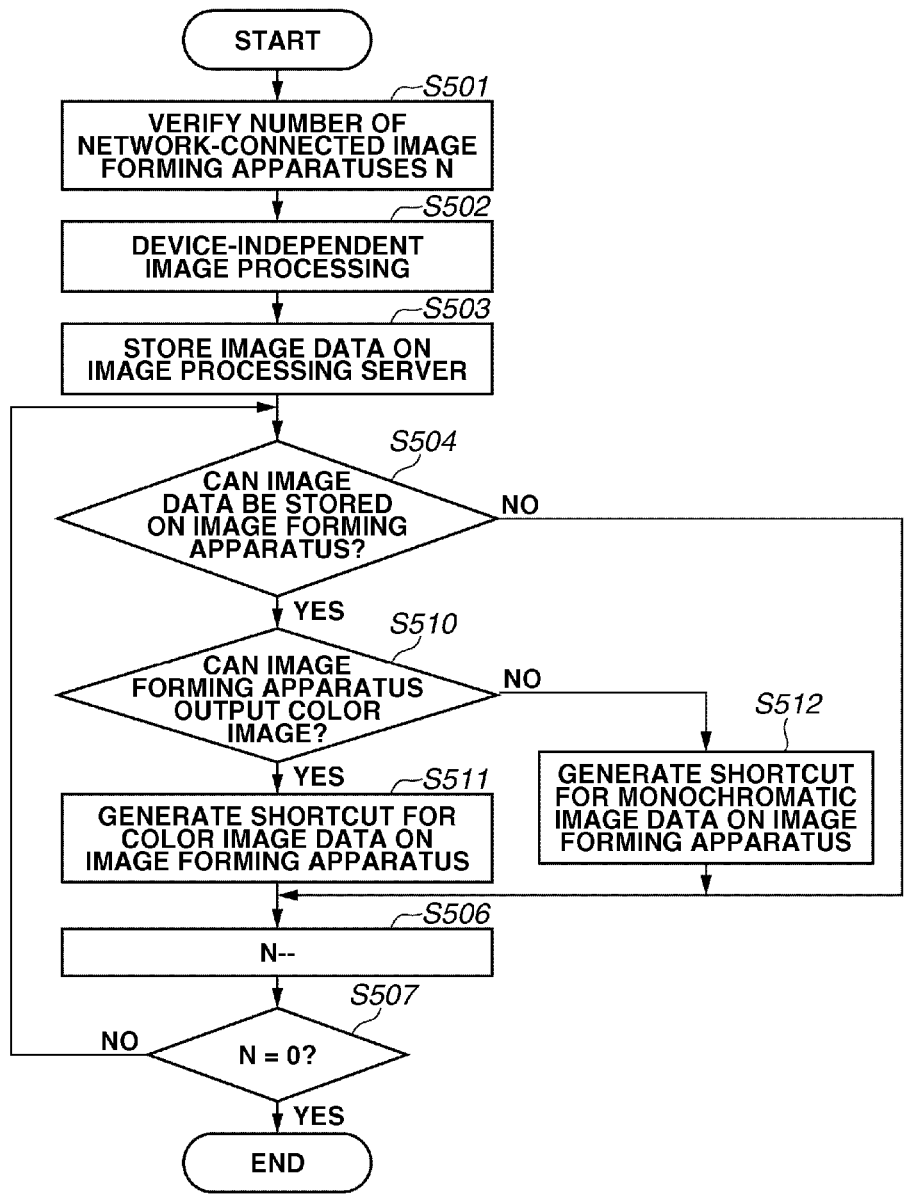
FIG. 9 is a flow chart illustrating an exemplary flow of job generation processing according to a second exemplary embodiment of the present invention.

FIG. 9 is a flow chart illustrating an exemplary flow of job generation processing executed by the image processing server 101. A control program for implementing the processing illustrated in FIG. 9 is loaded and executed by the CPU 1101 from the ROM 1103 as described above.

Referring to FIG. 9, processing in steps S501, S504, S506 and S507 is similar to that of the first exemplary embodiment. Accordingly, the detailed description thereof will not be repeated here.

In step S502, the device-independent image processing unit 1110 executes two types of device-independent image processing (i.e., image processing on full color image data and on monochromatic image data) on the image data. In generating full color image data and monochromatic image data on the device-independent image processing unit 1110, such image data can be generated by the determination as to whether to execute the processing by the gray conversion unit 204.

In step S503, the CPU 1101 stores the full color image data and the monochromatic image data generated in step S502 on the HDD 1104. If it is determined that the image forming apparatuses 102a through 102m can store the image data (YES in step S504), then the processing advances to step S510. In step S510, the CPU 1101 determines whether the data transmission target image forming apparatuses 102a through 102m can output a color image.

In step S511, the CPU 1101 transmits a shortcut image for color image to the image forming apparatus that has been determined to be able to output a color image among the image forming apparatuses 102a through 102m in step S510. More specifically, the CPU 1101 stores the shortcut image for color image on the HDD 1206 of the data transmission target image forming apparatus 102. To the shortcut image, identification information indicating the storage location of the full color image data stored on the HDD 1104 has been added.

On the other hand, the CPU 1101 transmits a shortcut image for monochromatic image to the image forming apparatus that has been determined not to be able to output a color image among the image forming apparatuses 102a through 102m. More specifically, in step S512, the monochromatic shortcut image is stored on the HDD 1206 of the data transmission target image forming apparatus 102. To the shortcut image, identification information indicating the storage location of the monochromatic image data stored on the HDD 1104 has been added.

By executing the above-described processing, the shortcut image for full color image data that has been processed by the device-independent image processing by the image processing server 101 is generated and stored on the HDD 1206 of the network-connected color image forming apparatus 102 during the job generation processing. Furthermore, by executing the above-described processing, the shortcut image for monochromatic image data that has been processed by the device-independent image processing by the image processing server 101 is generated and stored on the HDD 1206 of the network-connected color image forming apparatus 102.

As described above, according to the present exemplary embodiment having the above-described configuration, a shortcut image for full color image data is generated on the image forming apparatuses 102a through 102h, 102j, and 102l while a shortcut image for monochromatic image data is generated on the image forming apparatuses 102i, 102k, and 102m.

With the above-described configuration, the present exemplary embodiment can implement full color image processing and monochromatic image processing on the image processing server 101 before pull printing. Accordingly, the present exemplary embodiment having the above-described configuration can reduce the number of man-hours of the image processing executed during the pull printing. Furthermore, the present exemplary embodiment can effectively reduce the processing load on the image processing server.

In a third exemplary embodiment of the present invention, it is supposed that the image forming apparatus 102 can store image data that has been subjected to halftone processing on an HDD. Processing, components, and units similar to those of the first and the second exemplary embodiments described above are provided with same reference numerals and symbols. Accordingly, the detailed description thereof will not be repeated here.

Figure 10:
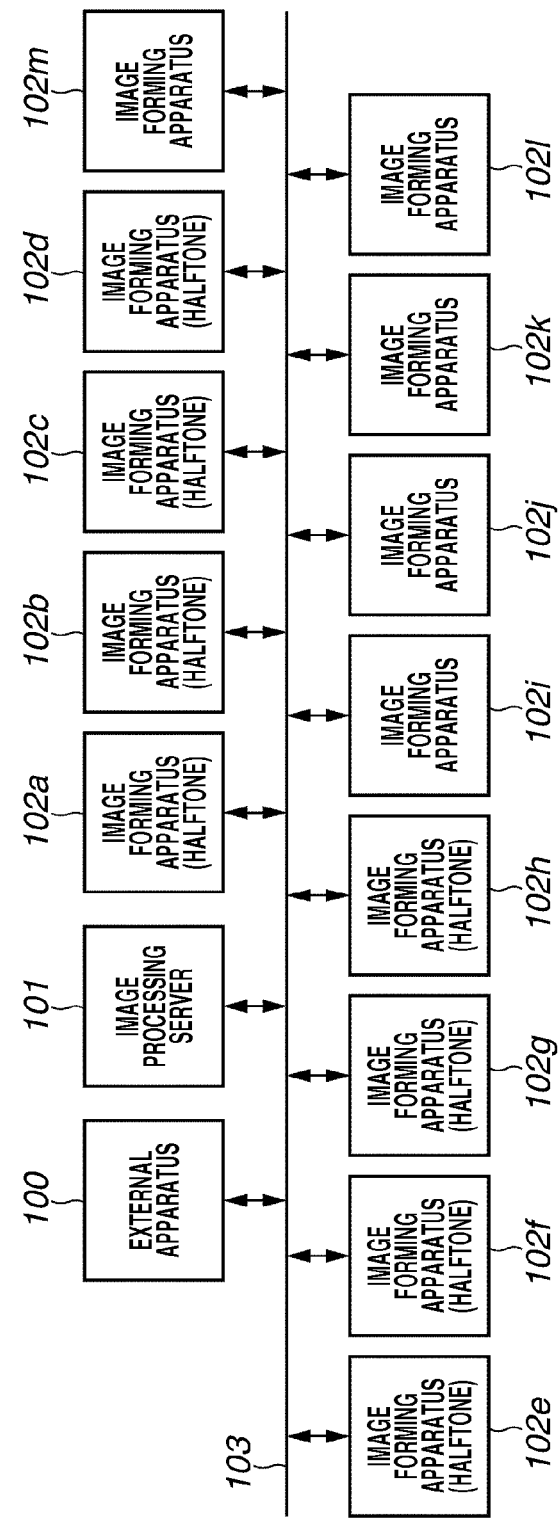
FIG. 10 illustrates an exemplary functional configuration of an image processing system according to a third exemplary embodiment of the present invention.

In the present exemplary embodiment, it is supposed, as illustrated in FIG. 10, that a plurality of image forming apparatuses 102a through 102h that stores halftone-processed image data on a HDD and that a plurality of image forming apparatuses 102i through 102m of models, which is different from the image forming apparatuses 102a through 102h, is connected to the network.

Figure 11:
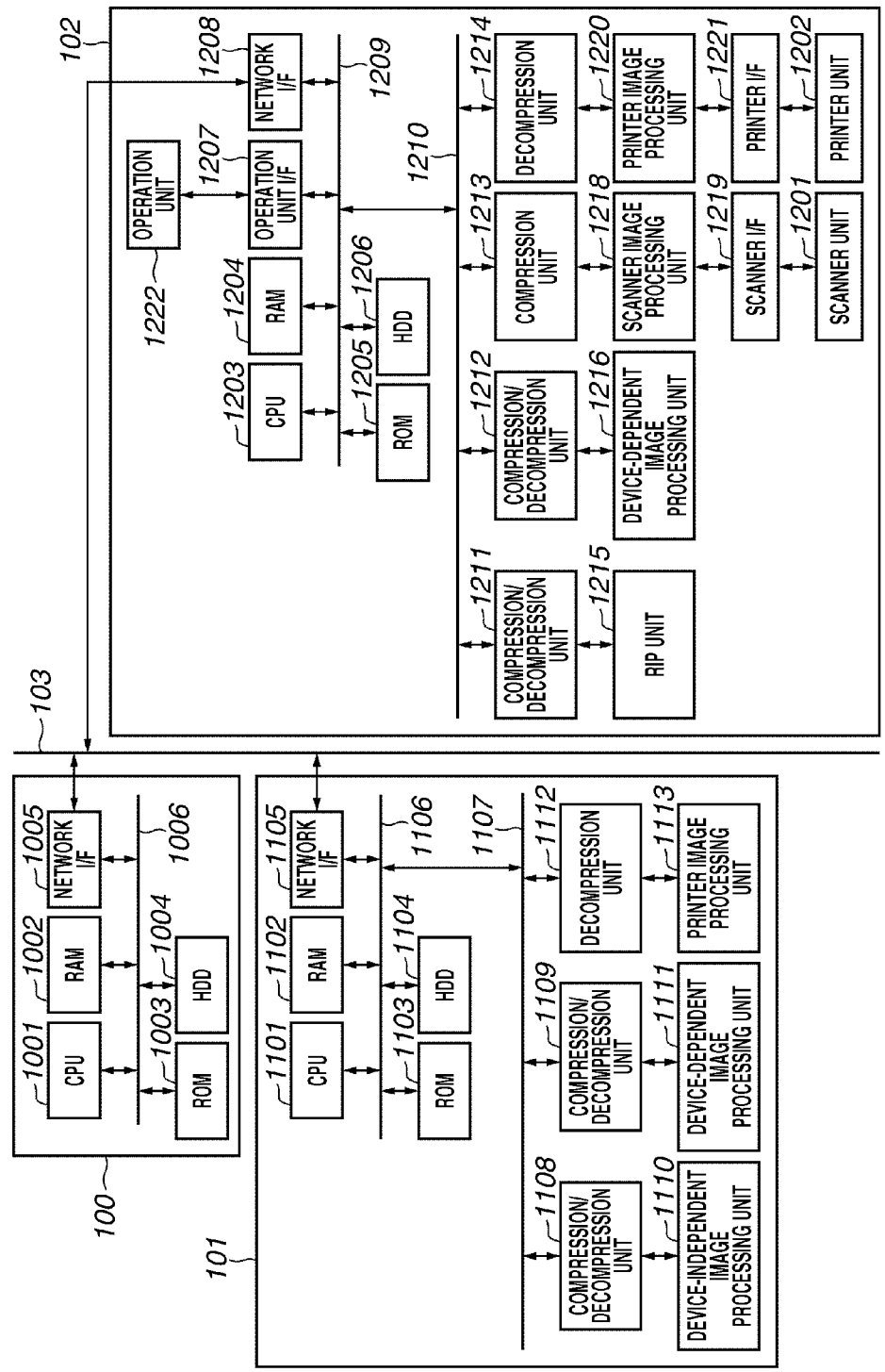
FIG. 11 illustrates an exemplary functional configuration of an image processing system according to the third exemplary embodiment of the present invention.

FIG. 11 is a block diagram illustrating an exemplary configuration of the entire image processing system according to the present exemplary embodiment. Referring to FIG. 11, a compression/decompression unit 1112 of the image processing server 101 compresses and decompresses image data.

A printer image processing unit 1113 receives the image data processed by the device-dependent image processing unit 1111 from the compression/decompression unit 1112. Subsequently, the printer image processing unit 1113 executes image processing similar to the image processing executed by the printer image processing unit 1220 of the image forming apparatus 102 on the image data. The image-processed image data is stored on the HDD 1104 via the compression/decompression unit 1112.

FIG. 12 is a flow chart illustrating an exemplary flow of job generation processing by the image processing server 101. A control program that implements the processing illustrated in FIG. 12 is stored on the ROM 1103 as described above and is executed by the CPU 1101.

Referring to FIG. 12, processing in steps S501 through S507 is similar to that of the first exemplary embodiment. Accordingly, the detailed description thereof will not be repeated here. In addition, for the image forming apparatus 102, the image forming apparatuses 102a through 102m are searched in this order.

If it is determined by the image processing server 101 that the image forming apparatus 102a can store the image data (YES in step S504), then the processing advances to step S513. In step S513, the CPU 1101 determines whether the image forming apparatus 102a is an apparatus that stores the halftone-processed image data on the HDD.

If it is determined that 102a is an apparatus that stores the halftone-processed image data on the HDD (YES in step S513), then the processing advances to step S514. In step S514, the CPU 1101 determines whether a transfer completion flag Flg is set to be ON. If it is determined that the transfer completion flag Flg is not set to be ON (NO in step S514), then the processing advances to step S515. In step S515, the device-dependent image processing unit 1111 executes the device-dependent image processing on the image data.

In step S516, the printer image processing unit 1113 executes printer image processing on the image data. In step S517, the CPU 1101 transfers the image data to the image forming apparatus 102a. In step S518, the image forming apparatus 102a stores the transferred image data on the HDD 1206. In step S519, the CPU 1101 sets the transfer completion flag Flg to be ON.

In step S520, the image processing server 101 generates a shortcut image of the image data that has been processed by the printer image processing on the HDD 1104. Then the processing advances to step S506. To the shortcut image, identification information indicating the storage location of the transferred image data stored on the HDD 1206 of the image forming apparatus 102a has been added.

On the other hand, if it is determined that the transfer completion flag Flg has been set to be ON (YES in step S514), then the processing advances to step S505. Furthermore, if it is determined that the image forming apparatus 102a is not an apparatus that stores the halftone-processed image data on the HDD (NO in step S513), then the processing advances to step S505. The present exemplary embodiment repeats the above-described processing for the number of times equivalent to the number of the network-connected image forming apparatuses.

By executing the above-described processing, the shortcut image corresponding to the data storage capacity of the image forming apparatus is generated and stored on the HDD 1206 of the network-connected image forming apparatus 102 during the job generation processing.

As described above, in the present exemplary embodiment, the halftone-processed image data that has been processed by the printer image processing is stored on the HDD 1206 of the image forming apparatus 102a and the shortcut image of the image data stored on the image forming apparatus 102a is generated and stored on the HDD of each of the image forming apparatuses 102b through 102h.

According to the present exemplary embodiment having the above-described configuration, the image processing server can flexibly comply with the method of each of a plurality of image forming apparatuses for storing data. Furthermore, with the above-described configuration, the present exemplary embodiment can generate and transfer image data dependent on the capacity of the model of the image forming apparatus during pull printing processing. Accordingly, the present exemplary embodiment can effectively reduce the processing load on the image processing server.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-050756 filed Mar. 8, 2010, which is hereby incorporated by reference herein in its entirety.

The invention claimed is:

1. An image processing system comprising a first image forming apparatus, a second image forming apparatus whose model is the same as a model of the first image forming apparatus, and an information processing system,
   wherein the first image forming apparatus includes a request unit configured, in printing an image designated by a user, to transmit a request for acquiring image data corresponding to the image designated by the user and having been stored within the information processing system to the information processing system,
   wherein the information processing system includes a dependent processing unit configured, if a request transmitted from the request unit has been received, to execute image processing dependent on a model of the first image forming apparatus on the image data,
   wherein the first image forming apparatus further includes:
   a storage unit configured to receive the image data that has been image-processed by the dependent processing unit and to store the received image data; and
   a first printing unit configured to print the received image data stored on the storage unit,
   wherein the information processing system further includes a transmission unit configured to transmit a shortcut for referring to the received image data stored on the storage unit to the second image forming apparatus of the same model as the first image forming apparatus, and
   wherein the second image forming apparatus includes:
   an acquisition unit configured, in printing the image designated by the user, to acquire the received image data stored on the storage unit based on a reference location indicated by the shortcut transmitted from the transmission unit; and
   a second printing unit configured to print the image data acquired by the acquisition unit.

2. The image processing system according to claim 1, further comprising a third image forming apparatus whose model is different from the models of the first image forming apparatus and the second image forming apparatus,
   wherein the information processing system includes:
   an independent processing unit configured to execute image processing independent from the model of each of the first through the third image forming apparatuses on externally received image data; and
   another transmission unit configured to store image data image-processed by the independent processing unit and to transfer a shortcut for referring to the stored image data to the first through the third image forming apparatuses, wherein the request unit is configured to request acquisition of image data stored on the information processing system based on a reference location of the shortcut transmitted from the another transmission unit, and
   wherein the independent processing unit is configured to execute image processing on the image data stored within the information processing system before the request unit transmits the request.

3. The image processing system according to claim 2, wherein if the shortcut is transmitted from the transmission unit, the second image forming apparatus replaces the shortcut that has been transmitted from the another transmission unit and stored with the shortcut transmitted from the transmission unit.

4. The image processing system according to claim 3, wherein the second image forming apparatus further includes a unique dependent processing unit configured, if the image data stored on the storage unit has been acquired, to execute image processing dependent on a device characteristic unique to the second image forming apparatus on the image data, and wherein the printing unit is configured to print the image data that has been image-processed by the unique dependent processing unit.

5. The image processing system according to claim 4, wherein the independent processing unit is configured to execute image processing on the externally received image data by full color image processing to generate full color image data and to execute image processing on the externally received image data by monochromatic image processing to generate monochromatic image data, and wherein the transmission unit is configured to transmit a shortcut for the full color image data to a full color image forming apparatus and to transmit a shortcut for the monochromatic image data to a monochromatic image forming apparatus.

6. The image processing system according to claim 5, wherein the independent processing unit is configured to execute at least one of input gamma correction processing, color balance and level correction processing, photographic correction processing, and gray conversion processing, wherein the dependent processing unit is configured to execute at least one of color matching processing, monochromatic data generation processing, luminance density conversion processing, output color correction processing, filtering processing, and application amount control processing, and wherein the unique dependent processing unit is configured to execute at least one of trapping and color misregistration correction processing, output gamma correction processing, and halftone correction processing.

7. An information processing system capable of communicating with a first image forming apparatus, a second image forming apparatus whose model is the same as a model of the first image forming apparatus, and a third image forming apparatus whose model is different from models of the first and the second image forming apparatuses, the information processing system comprising:

a dependent processing unit configured, if it has been requested from the first image forming apparatus to acquire image data corresponding to an image that has been instructed by a user to be printed via the first image forming apparatus and having been stored on the information processing system, to execute image processing dependent on the model of the first image forming apparatus on the image data; and a transmission unit configured to transmit a shortcut for referring to image data that has been image-processed by the dependent processing unit and stored on the first image forming apparatus that has requested the acquisition of the image data to the second image forming apparatus, wherein if the user prints the image whose printing has been instructed by the user on the second image forming apparatus, the second image forming apparatus acquires the image data stored on the first image forming apparatus based on a reference location indicated by the shortcut transmitted from the transmission unit, and wherein if the user prints the image whose printing has been instructed by the user on the third image forming apparatus, the third image forming apparatus acquires the image data, which has been subjected to image processing corresponding to the model of the third image forming apparatus on the image data, from the image processing system.

8. A method for controlling an information processing system capable of communicating with a first image forming apparatus, a second image forming apparatus whose model is the same as a mode of the first image forming apparatus, and a third image forming apparatus whose model is different from models of the first and the second image forming apparatuses, wherein if it has been requested from the first image forming apparatus to acquire image data corresponding to an image that has been instructed by a user to be printed via the first image forming apparatus and having been stored on the information processing system, a dependent processing unit executes image processing dependent on the model of the first image forming apparatus on the image data; and wherein a transmission unit transmits a shortcut for referring to image data that has been image-processed by the dependent processing unit and stored on the first image forming apparatus that has requested the acquisition of the image data to the second image forming apparatus, wherein if the user prints the image whose printing has been instructed by the user on the second image forming apparatus, the second image forming apparatus acquires the image data stored on the first image forming apparatus based on a reference location indicated by the shortcut transmitted from the transmission unit, and wherein if the user prints the image whose printing has been instructed by the user on the third image forming apparatus, the third image forming apparatus acquires the image data, which has been subjected to image processing corresponding to the model of the third image forming apparatus on the image data, from the image processing system.

9. A non-transitory computer-readable storage medium that stores a computer program for causing a computer to execute the method for controlling the information processing system according to claim 8.

* * * * *